United States Patent [19]

Ito et al.

[11] Patent Number: 4,819,773
[45] Date of Patent: Apr. 11, 1989

[54] VALVE STRUCTURE FOR HYDRAULIC DAMPER

[75] Inventors: Hidekuni Ito; Heihati Kondo, both of Shizuoka, Japan

[73] Assignee: Kabushiki Kaisha Showa Seisakusho, Japan

[21] Appl. No.: 72,865

[22] Filed: Jul. 14, 1987

[30] Foreign Application Priority Data

Jul. 14, 1986 [JP] Japan .............. 61-107823[U]

[51] Int. Cl.$^4$ .............................................. F16F 9/34
[52] U.S. Cl. .............................. 188/322.15; 188/317
[58] Field of Search ............. 188/320, 322.22, 322.15, 188/322.14, 322.11, 317

[56] References Cited

U.S. PATENT DOCUMENTS

| | | |
|---|---|---|
| 3,747,714 | 7/1973 | DeCarbon. |
| 4,460,074 | 7/1984 | Muller et al. ................. 188/322.14 |
| 4,615,420 | 10/1986 | Mourray ........................ 188/317 X |

FOREIGN PATENT DOCUMENTS

| | | | |
|---|---|---|---|
| 0119019 | 10/1944 | Australia ............................. 188/317 |
| 0127935 | 6/1986 | Japan ............................. 188/322.14 |

*Primary Examiner*—Andres Kashnikow
*Assistant Examiner*—Richard Potosnak
*Attorney, Agent, or Firm*—Scherlacher, Mok & Roth

[57] ABSTRACT

A hydraulic damper includes a cylinder filled with working oil, a piston rod extending axially in the cylinder, and a piston slidably disposed in the cylinder and fixed to the piston rod, the piston having an oil passage defined therein. A valve structure in the hydraulic damper has a spacer disposed around the piston rod and on one surface of the piston, a leaf valve disposed around the spacer for normally closing an end of the oil passage at the piston surface, and a restriction plate disposed around the piston rod and mounted on the spacer and the leaf valve for allowing the leaf valve to open the end of the oil passage only during one of compression and expansion strokes of the piston with respect to the cylinder.

2 Claims, 3 Drawing Sheets

VALVE STRUCTURE FOR HYDRAULIC DAMPER

BACKGROUND OF THE INVENTION

1. Field of the Invention

The present invention relates to a valve structure in the piston of a hydraulic damper for use in a motor vehicle or the like.

2. Description of the Relevant Art

FIG. 3 of the accomanying drawings shows a conventional valve structure in the piston of a hydraulic damper.

The valve structure, generally designated by the reference numeral 51, has an oil hole 55 defined in the piston 54 fixed to an end of a piston rod 53 and slidably disposed in a damper cylinder 52. The valve structure 51 also has a leaf valve 56 disposed so as to normally close an upper open end of the oil hole 55. The leaf valve 56 has an outer peripheral portion supported at its lower surface on a ridge 54a of the piston 54 and an inner peripheral edge with its upper surface held against a spacer 58 interposed between the piston 54 and a valve seat 57 mounted on the piston rod 53. The piston 54 also has an oil hole 59 branched from the oil hole 55 and opening radially outwardly of the leaf valve 56. The piston 54 divides the interior space of the cylinder 52 into a lower oil chamber 60 and an upper oil chamber 61. During a compression stroke of the damper, working oil in the lower oil chamber 60 flows through the oil hole 55 and the oil hole 59 into the upper oil chamber 61. When the leaf valve 56 is subjected to a hydraulic pressure beyond a certain pressure level, the outer peripheral portion of the leaf valve 56 is flexed upwardly off the ridge 54a about a supporting edge 58a of the spacer 58 by the working oil flowing from the lower oil chamber 60 into the oil hole 55. Therefore, the upper end of the oil hole 55 is opened, allowing the working oil to flow from the oil hole 55 into the upper oil chamber 61 past the outer peripheral edge of the leaf spring 56. During an expansion stroke, working oil in the upper oil chamber 61 flows back through the oil hole 59 and the oil hole 55 into the lower oil chamber 60. When the leaf valve 56 undergoes an oil pressure beyond a certain pressure level, the inner peripheral edge thereof is flexed downwardly off the supporting edge 58a about the ridge 54a of the piston 54, thus opening the upper end of the oil hole 55. The working oil is now allowed to flow from the upper oil chamber 61 past the leaf valve 56 through the oil hole 55 back into the lower oil chamber 60.

As described above, the leaf valve 56 is flexed at its outer and inner peripheral portions or edges in opposite directions during the compression and expansion strokes, respectively. Repetition of such alternate flexing of the leaf valve 56 in the opposite directions will eventually result in permanent deformation of the leaf valve 56 due to metal fatigue. If the leaf valve 56 were increased in thickness to prevent the same from being deformed, then the damper would fail to provide sufficient damping action against small shocks.

The conventional valve structure shown in FIG. 3 is basically disclosed in U.S. Pat. No. 3,747,714 patented July 24, 1973.

SUMMARY OF THE INVENTION

It is an object of the present invention to provide a valve structure for a hydraulic damper which includes a leaf spring subjected to less fatigue and having a long service life.

According to the present invention, there is provided a valve structure in a hydraulic damper including a cylinder, a piston rod extending axially in the cylinder, and a piston slidably disposed in the cylinder and fixed to the piston rod, the piston having an oil passage defined therein, the valve structure comprising a spacer disposed around the piston rod and on one surface of the piston, a leaf valve disposed around the spacer for normally closing an end of the oil passage at the piston surface, and a restriction plate disposed around the piston rod and mounted on the spacer and the leaf valve for allowing the leaf valve to open the end of the oil passage only during one of compression and expansion strokes of the piston with respect to the cylinder. Since the leaf valve flexes to open the end of the oil passage only during one of the compression and expansion strokes, the leaf valve is subjected to less fatigue and has an increased service life.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
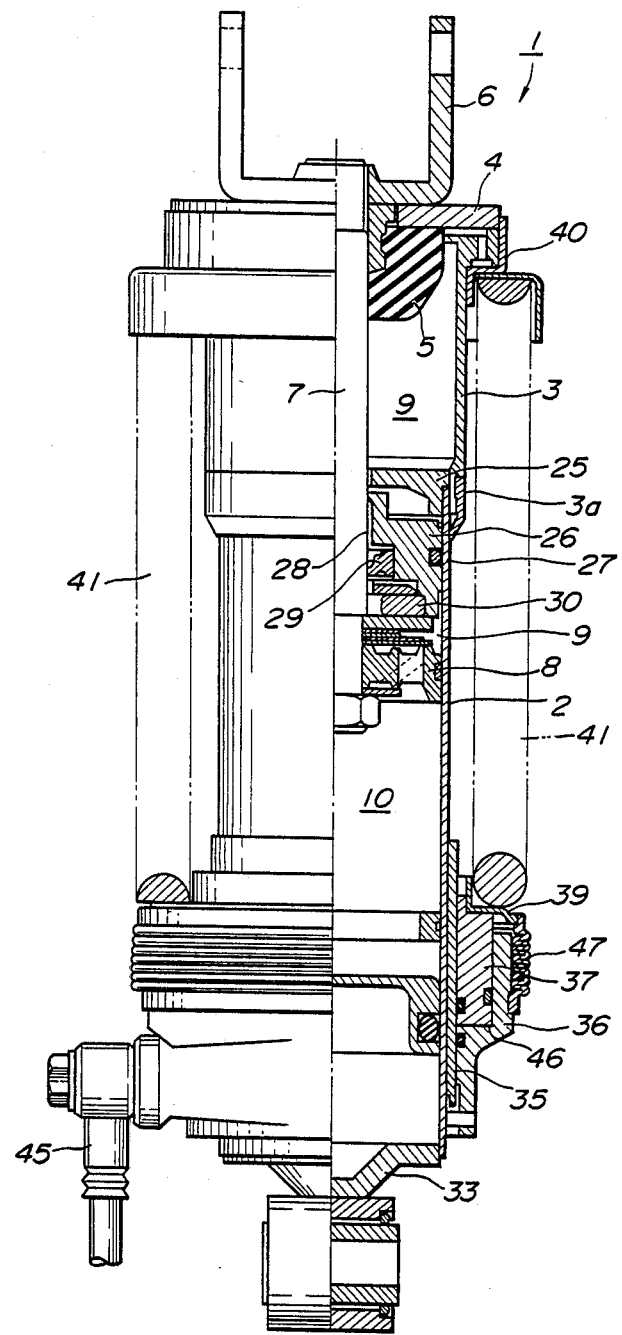
FIG. 1 is a fragmentary longitudinal cross-sectional view of a hydraulic damper incorporating a valve structure according to the present invention.

As shown in FIG. 1, a hydraulic damper 1 includes a cylinder 2 filled with working oil and partly disposed slidably in a tubular member 3. The tubular body 3 has a stepped lower end on which there is mounted an annular seal cover 3a with its lower end slidably held against the outer circumferential surface of the cylinder 2. A cap 4 is mounted on the upper end of the tubular body 3, the cap 4 having a lower surface to which a bump rubber member 5 projecting into the tubular member 3 is attached.

A piston rod 7 disposed coaxialy in the cylinder 2 and the tubular member 3 has an upper end portion projecting through the cap 4 and fixed to a bracket 6 disposed on the upper surface of the cap 4. A piston 8 is mounted on the lower end portion of the piston rod 7 and is slidably held against the inner circumferential surface of the cylinder 2. The piston 8 divides the interior space of the cylinder 2 into an upper oil chamber 9 and a lower oil chamber 10.

Figure 2:
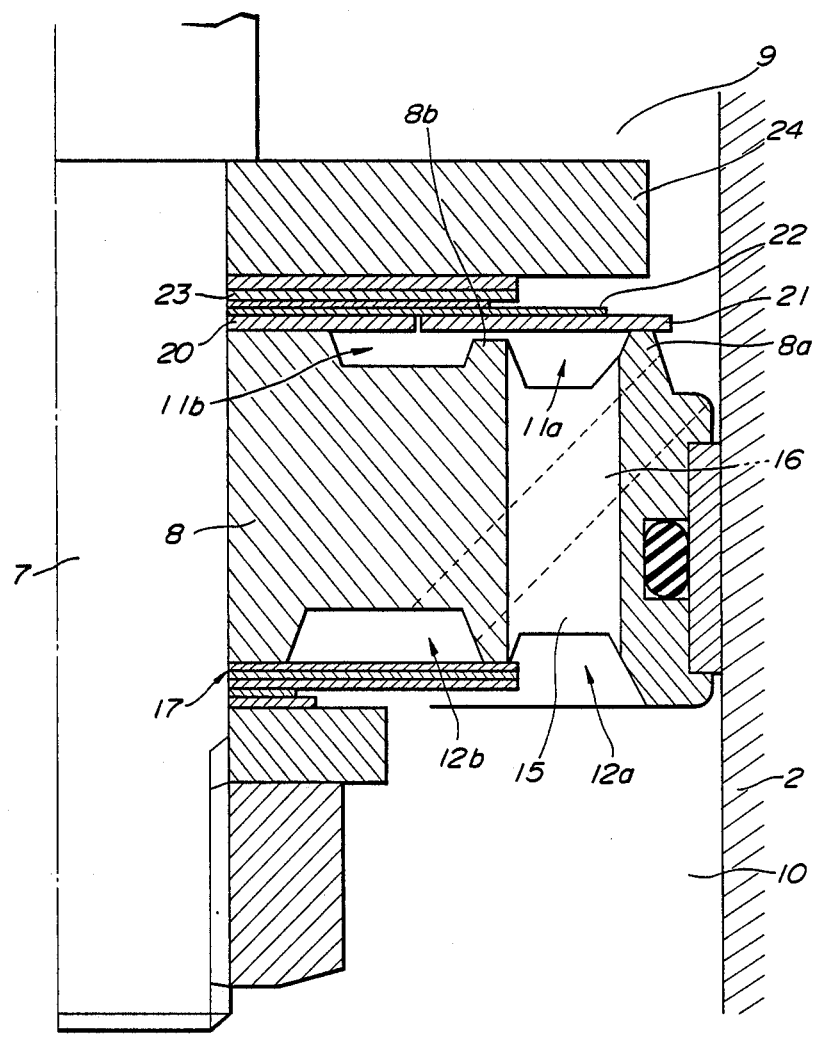
FIG. 2 is an enlarged fragmentary cross-sectional view of the valve structure of the present invention.
Figure 3:
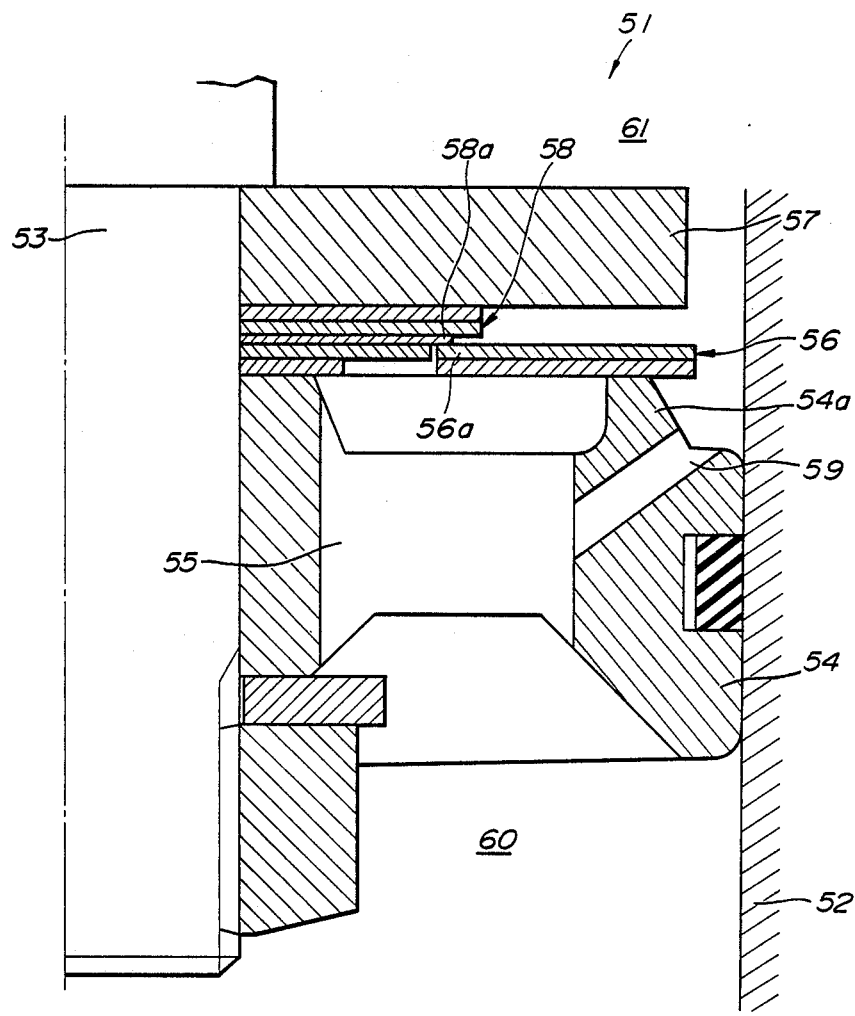
FIG. 3 is an enlarged fragmentary cross-sectional view of a conventional valve structure.

As illustrated in FIG. 2, the piston 8 has outer and inner annular grooves 11a, 11b defined in its upper surface and outer and inner annular grooves 12a, 12b defined in its lower surface. The piston 8 also has an axial compression oil passage 15 defined therein and extending between the outer annular grooves 11a, 12a and an oblique expansion oil passage 16 defined therein and extending between an outer peripheral portion positioned radially outwardly of the outer annular groove 11a and the inner annular groove 12b.

A valve 17 is disposed around the piston rod 7 and against the lower surface of the piston 8 so as to normally close the expansion oil passage 16. A spacer 20 is disposed around the piston rod 7 and against the upper surface of the piston 8. An annular leaf valve 21 is fitted over, i.e., disposed radially outwardly, of the spacer 20, and has an outer peripheral portion that normally rests on an outer ridge 8a of the piston 8 for normally closing the compression oil passage 15. A restriction plate 22 is disposed around the piston rod 7 and held against the upper surfaces of the spacer 20 and the leaf valve 21. The restriction plate 22 serves to allow the leaf valve 21 to flex so that its outer peripheral portion is lifted off the outer ridge 8a to open the compression oil passage 15 only when the piston 8 is in its compression stroke. During an expansion stroke, the restriction plate 22 is deformed to force the leaf valve 21 against the outer ridge 8a to completely close the compression oil passage 15.

A plurality of spacers 23 are fitted over the piston rod 7 and disposed on the restriction plate 22, and a valve seat 24 is disposed on the spacers 23. The piston 8 also has a ridge 8b on its upper surface which is positioned radially between the outer and inner grooves 11a, 11b for engaging a radially inner portion of the leaf valve 21 to limit excessive downward flexing thereof during the compression stroke. The outer peripheral edge of the lower surface of the valve seat 24 serves to engage a radially outer portion of the leaf valve 21 to limit its upward flexing beyond a certain extent when opening the compression oil passage 15.

As shown in FIG. 1 a cylinder cap 25 is fitted in the upper end of the cylinder 2 and the lower end of the tubular member 3. A guide 26 is also fitted in the cylinder 2 below the cylinder cap 25, with a seal ring 27 fitted around the guide 26 and a guide bushing 28 fitted in the guide 26. The guide 26 has an upper inner step therein in which there is fitted an oil seal 29 held in slidable contact with the piston rod 7. The guide 26 also as a lower inner step therein which accommodates therein a rebound rubber body 30 held against the upper surface of the valve seat 24.

A lower coupling 33 is fixed to the lower end of the cylinder 2. A tubular member 35 is fitted over and secured to a lower portion of the cylinder 2. A jack cylinder 36 is securely fitted over the tubular member 35. The jack cylinder 36 has an inner peripheral surface radially spaced from the outer peripheral surface of the tubular member 35, with a plunger 37 being axially slidably disposed between the jack cylinder 36 and the tubular member 35. A suspension spring 41 is disposed under compression between a spring seat 39 fixed to the upper end of the plunger 37 and a spring seat 40 fixed to the upper outer periphery of the tubular member 3. Oil supplied from an oil tank (not shown) via a pipe 45 is introduced into an oil chamber 46 defined between the jack cylinder 36 and the plunger 37 to adjust the spring load of the suspension spring 41.

The valve structure thus constructed will operate as follows:

During the compression stroke of the piston 8, the cylinder 2 is moved upwardly along the lower inner peripheral portion of the tubular member 3 while compressing the suspension spring 41. As the cylinder 2 ascends, the cylinder cap 4, the guide 26, the seal 29, and the rebound rubber body 30 are also moved upwardly, increasing the volume of the upper oil chamber 9. The hydraulic pressure of oil in the lower oil chamber 10 is increased by the piston 8, causing the oil in the lower oil chamber 10 to flow into the compression oil hole 15. The oil then lifts the outer peripheral portion of the leaf valve 21 off the ridge 8a, thus providing an opening between the leaf valve 21 and the cylinder 8 in communication with the upper end of the compression oil hole 15. The area of opening between the leaf valve 21 and the cylinder 8 is proportional to the magnitude of a shock applied to the damper 1. When the oil flows from the compression oil passage 15 past the leaf valve 21 into the upper oil chamber 9, the oil is subjected to resistance, thereby producing a damping force. The upward movement of the cylinder 2 is stopped when the upper surface of the cylinder cap 25 abuts against the lower surface of the bump rubber body 5.

When the piston 8 is in its expansion stroke, the cylinder 2 is lowered along the lower inner peripheral surface of the tubular member 3 while allowing the suspension spring 41 to expand. On the descending travel of the cylinder 2, the cylinder cap 4, the guide 26, the oil seal 29, and the rebound rubber body 30 are moved downwardly to reduce the volume of the upper oil chamber 9. At the same time, the volume of the lower oil chamber 10 is increased to lower the hydraulic pressure in the lower oil chamber 10. The working oil in the upper oil chamber 9 is then forced to flow through the expansion oil passage 16 while lowering the valve 17 off the cylinder 8 thereby to open the lower end of the expansion oil passage 16, from which the working oil flows into the lower oil chamber 10. At this time, a damping force is produced by the resistance to which the oil flow is subjected upon passage through the expansion oil passage 16 past the valve 17 into the lower chamber 10. When the rebound rubber body 30 engages the valve seat 24 as shown in FIG. 1, the downward movement of the cylinder 2 is brought to a stop.

As described above, the leaf valve 21 is permitted by the restriction plate 22 to flex to allow the working oil to flow through the compression oil passage 15 only during the compression stroke. The compression oil passage 15 is closed by the leaf valve 21 when the piston 8 is in the expansion stroke, the leaf valve 21 being prevented by the restriction plate 22 from flexing at this time. Since the leaf valve 21 only flexes during one of the reciprocating strokes of the hydraulic damper 1, the leaf valve 21 will have a longer service life because it undergoes a smaller degrees of fatigue.

Although there has been described what is at present considered to be the preferred embodiment of the present invention, it will be understood that the invention may be embodied in other specific forms without departing from the spirit of essential characteristics thereof. The present embodiment is therefore to be considered in all aspects as illustrative, and not restrictive. The scope of the invention is indicated by the appended claims rather than by the foregoing description.

We claim:

1. A piston assembly for a hydraulic damper, comprising:
   a generally cylindrical piston having a longitudinally extending central axis and including upper and lower surface, a first passage extending between the upper and lower surfaces, and a second passage extending between the upper and lower surfaces;
   a piston rod attached to the piston and extending along the longitudinal axis;
   first valve means for normally closing one end of said first passage and opening said one end of the first passage only during the compression stroke;

second valve means normally closing one end of said second passage and opening said one end of the second passage only during the extension stroke;

said piston further including inner and outer annular ridges, said outer annular ridge being greater in height than said inner annular ridge in a direction parallel to the longitudinal axis of the piston;

said first valve means including a spacer fit around said piston rod and resting on the upper surface of the piston, a leaf ring concentric with said spacer and resting on the outer annular ridge, and a disk fit around said piston rod and superimposed on said spacer and said leaf ring, said disk allowing said leaf ring to open only during the compression stroke while preventing flexure of the leaf ring during the extension stroke.

2. A valve structure according to claim 1, wherein said first-mentioned oil passage extends through said piston in a direction parallel to the longitudinal axis of the piston, and said second oil passage extends through said piston in a direction that is oblique to the longitudinal axis of the piston.

* * * * *